April 9, 1968     R. A. MUNSE     3,376,612

DEVICE FOR SEPARATING ARMS OF C-CLIP

Filed Dec. 19, 1966

INVENTOR.
ROBERT A. MUNSE
BY
Prazer & Prazer
ATTORNEYS

United States Patent Office 3,376,612
Patented Apr. 9, 1968

3,376,612
DEVICE FOR SEPARATING ARMS OF C-CLIP
Robert A. Munse, Perrysburg, Ohio, assignor to The Bishop and Babcock Corporation, Toledo, Ohio, a corporation of Ohio
Continuation-in-part of application Ser. No. 598,561, Oct. 12, 1966. This application Dec. 19, 1966, Ser. No. 617,452
3 Claims. (Cl. 24—73)

ABSTRACT OF THE DISCLOSURE

A one-piece C-shaped spring metal clip, the arms of which consist of generally flat plates joined at one end by a bend portion and at least one arm inclining from such bend portion toward the free end portion of the other arm and the free ends of both arms being in close juxtaposition. The intermediate portions of the arms are spaced apart in gradually decreasing fashion from the bend portion to the free end portions to enable the fastener to receive and grippingly engage a panel of appreciable thickness between the plates. On the free end of each plate is a finger-like extension, one extension being at one side and the other extension being at the other side in laterally spaced relation. The spacing of the finger-like extensions enables spreading of the arms by applying the extensions to opposite faces of a panel and then twisting the clip, the inner edge portions of the finger-like extensions being disposed generally parallel to each other for resisting retrograde movement of the clip away from the panel during twisting movement. One plate may have a hole generally aligned with nut means on the other plate.

---

This application constitutes a continuation-in-part of application Ser. No. 598,561, filed Oct. 12, 1966.

This invention relates to spring metal fasteners but more particularly to C-shaped fasteners which may be applied to two or more panels to hold them together and also to fasteners of this type usually applied to an edge portion of a supporting panel and equipped on one arm with a nut or shank-engaging means for the reception of a screw or plain stud and on the other arm with a registering hole, the screw or stud being applied through a hole in the panel with which the nut or shank engaging means and the arm hole are aligned.

Usually C-shaped fasteners are of spring metal which is important grippingly to hold the fasteners in proper engagement with the supporting panel to militate against their becoming dislodged as a result of jars or shocks. Thus the degree of spring tension is relatively high so that the two arms of the fastener can be separated only with difficulty which is enhanced because of the close juxtaposition of the free ends of these arms. The trouble encountered in applying these fasteners to supporting panels is further increased by their small dimensions. For example these fasteners may be of the order of ⅝ inch in length and ⅜ inch in width, and, although the dimensions vary considerably, these are as a general rule of very small size. The workmen who apply these fasteners, for example in automobile, refrigerator and stove factories, endeavor to line a fastener with the edge of a sheet metal panel and then hit it with a hammer with the intention of concomitantly spreading the arms and driving it home. Not infrequently the aim is not true, and the fastener flies out of use. The operation is a costly time consumer and, coupled with the waste of fasteners, is inefficient.

An object is to produce a fastener of this character, the arms of which can be quickly and easily spread by a twisting action so as greatly to reduce, if not entirely eliminate, the difficulty heretofore encountered in applying them to panels without in any manner reducing the spring tension or otherwise changing the general size or shape and to militate against retrograde drifting of the fastener during the twisting movement incident to panel application.

Other objects and advantages of the invention will hereinafter appear and, for purposes of illustration but not of limitation, an embodiment of the invention is shown on the accompanying drawings, in which—

Figure 2:
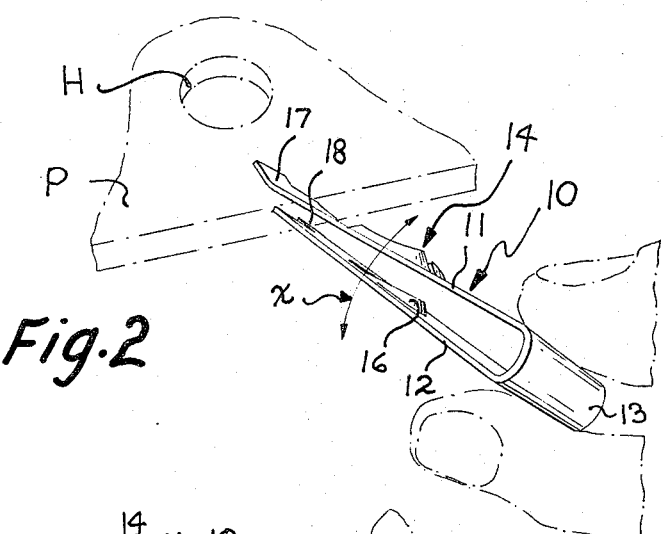
Figure 3:
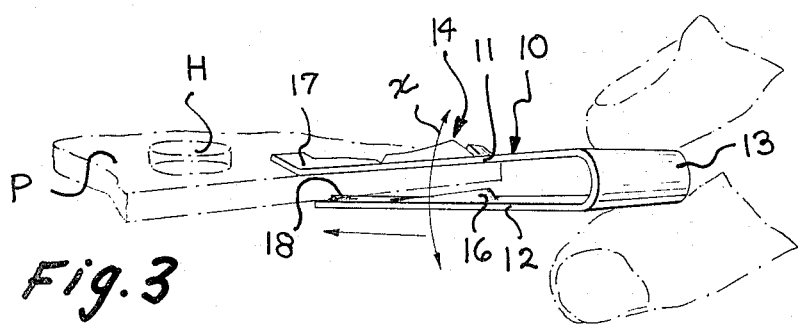
Figure 1:
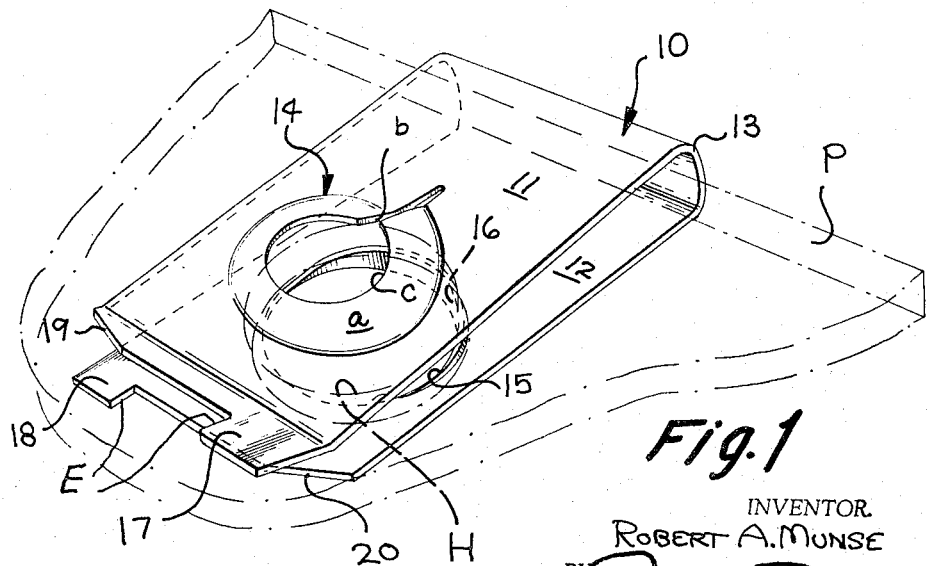

FIGURE 1 is a top perspective view of a C-fastener embodying the invention and showing the same applied to an apertured supporting panel of sheet metal, the latter being shown in broken lines; and FIGURES 2 and 3 are side perspective views of the fastener shown in FIGURE 1 and illustrating the manner of applying it to the supporting panel, FIGURE 2 showing the first operation of straddling the panel by the extensions on the arms of the fastener and FIGURE 3 showing the fastener after it has been twisted to effect an opening or spreading of the arms relative to each other.

C-fasteners of the type to which this invention relates are well known in the art, as shown by way of example in U.S. Patents 2,233,230 and 2,298,568 although they do not show the exact form of fasteners as used in the industry in which the free end portions of the arms are either in engagement with each other or are spaced from each other very slightly so that due to their small size and the spring characteristics of the metal they can be spread apart only with difficulty. As a further reference to the prior art the U.S. Patents 1,070,683 and 1,621,924 are cited but these fail completely to show applicant's inventive concept because they were never intended to be pried apart for application purposes and in fact the curved or beveled surfaces militate against satisfactory operation because of retrograde slippage in the twisting step.

The illustrated embodiment of the invention comprises a C-clip or fastener 10 having an upper plate arm 11 and a lower plate arm 12, the two arms being integrally connected by a curved connecting portion 13. The plate arms 11 and 12 are generally flat and of about the same length and width. The fastener is of spring sheet metal and as shown the free end portions of the arms are normally in close juxtaposition. In some instances these arm portions touch each other. It should be noted that the two arms 11 and 12 slope toward each other from the connecting portion 13. In the upper arm 11 is a nut 14, which in this instance is in the form of the well-known "Prestole" and constitutes a screw-receiving impression which may generally be described as in the form of a frusto-conical protuberance $a$, which is radially slitted at $b$, there being a central hole $c$, the edge of which is in the form of a helix so as screw-threadedly to engage a screw or a bolt applied thereto. Manifestly, other forms of nut impressions may be employed or, if desired, a standard nut may be welded or otherwise suitably secured to one of the arms. Furthermore, gripping tongues may be provided to engage a plain shank or stud. In the lower arm 12 of the fastener is a hole 15, which is aligned with the hole $c$ of the nut impression 14. In this instance the hole 15 is partially edged by an upstanding locator flange 16, which when the fastener is slipped over the edge of a supporting panel P of sheet metal, the locator flange 16 will snap into the hole H in the panel for holding the fastener in the applied position. It is to be understood that the above described structure is old and well known in the art.

These small spring-tensioned fasteners are difficult to apply to the supporting panel and this invention overcomes such difficulties and greatly simplifies the spreading of the arms, so that the fastener can be slipped over the edge of the supporting panel P without difficulty. For this purpose, each of the arms 11 and 12 has an outwardly projecting tab or finger 17 and 18 respectively. These tabs or fingers are located at opposite sides, the finger 17 being disposed at one side of the arm 11 and the finger 18 being disposed at the opposite side of the arm 12. The inner edge E of each of the fingers 17 and 18 is basically straight and is disposed generally in a plane perpendicular to the axis of the nut impression 14, and such edge portions are about parallel to each other. By having these edge portions substantially parallel to each other, the fastener does not drift in retrograde fashion during the twisting movement hereinafter described. At the side of the arm 11, adjacent the finger 18, is a bevel or cutaway portion 19 and on the arm 12, adjacent the finger 17, is a cutaway or bevel 20.

By the use of the two projecting tabs or fingers 17 or 18, the fastener is applied to the edge of the panel P as indicated on FIGURE 2, the fastener being applied in a tilted position so that the finger 17 is disposed above the upper surface of the panel P and the finger 18 below the under surface of the panel P. Then, by imparting a twisting action to the fastener in the direction of the arrow $x$, the arms are forced or cammed away from each other a sufficient amount so that the fastener can readily be pushed over the edge of the panel and advanced to the position shown in FIGURE 1 to register with the hole H, with the nut impression aligned therewith on one side of the panel, and the hole 15 aligned with the hole at the under side of the panel, the locator flange 16 snapping into the hole to retain the fastener in position of use. Thus, by a simple twisting action of the fastener, which is operative to spread the two arms away from each other a distance approximating the thickness of the panel P, the fastener can be applied without difficulty and in a fraction of the period of time otherwise required for this operation. Since the edge portions E are substantially parallel to each other, the tendency of the clip to move rearwardly out of engagement with the panel is resisted. The cutaway portions 19 and 20 expedite the application of the fingers 17 and 18 in their proper position prior to the twisting action of the fastener.

It is to be understood that although the embodiment above described is a clip formed with a nut impression on one arm and an aligned aperture on the other arm, plain C-clips without any nut means can utilize the twist feature, for example, where several relatively stiff panels or parts are held together by one or more clips.

Numerous changes in details of construction, arrangement and choice of materials may be effected without departing from the spirit of the invention, especially as defined in the appended claims. As recited in the claims, the expression "nut means" is intended to cover a nut impression, a separate nut attached to the fastener, and devices on the fastener for engaging a plain shank or stud.

What I claim is:

1. A fastener comprising a spring sheet metal C-clip adapted to be slipped over an apertured panel, the arms being integrally connected at one end and inclining toward each other with the free end portions in close juxtaposition, nut means on one arm, the other arm having a hole generally aligned with said nut means, finger-like extensions on the free ends of the clip arms respectively, one extension being at one side and the other extension being at the other side in laterally spaced relation to said first extension, said extensions being spaced laterally from each other a distance sufficient to enable the arms to be spread apart by applying same to opposite faces of a panel and twisting the fastener, and means for militating against retrograde drifting of the clip during panel application.

2. A fastener as claimed in claim 1 in which said means for militating against drifting comprises inner edge portions on said finger-like extensions disposed generally parallel to each other.

3. A fastener comprising a one-piece C-shaped spring metal clip, the arms of which consist of generally flat plates joined at one end by a bend portion and at least one arm thereof inclining from such bend portion toward the free end portion of the other arm and the free end portions of said arms being in close juxtaposition, the intermediate portions of said arms being spaced apart in gradually decreasing fashion from said bend portion to said free end portions to enable the fastener to receive and grippingly engage a part or panel of appreciable thickness between said plates, and a finger-like extension on the free end of each plate, one extension being at one side and the other extension being at the other side in laterally spaced relation to said first extension, such spacing enabling spreading of the arms by applying said extensions to opposite faces of a part or panel and then twisting the clip, and the inner edge portions of said finger-like extensions being disposed generally parallel to each other, thereby to resist retrograde movement of the clip away from the part or panel during twisting movement.

References Cited

UNITED STATES PATENTS

| | | | |
|---|---|---|---|
| 1,070,683 | 8/1913 | Hale | 24—259 |
| 2,115,312 | 4/1938 | Lombard | 151—41.75 XR |
| 2,298,568 | 10/1942 | Kost | 151—41.75 |

DONALD A. GRIFFIN, *Primary Examiner.*